United States Patent [19]

Namimoto et al.

[11] 4,352,157

[45] * Sep. 28, 1982

[54] DATA-PROCESSING APPARATUS HAVING IMPROVED INTERRUPT HANDLING PROCESSOR

[75] Inventors: Keiji Namimoto, Yokohama; Seiji Eguchi, Kawasaki; Yutaka Murao, Tokyo, all of Japan

[73] Assignee: Tokyo Shibaura Electric Co., Ltd., Japan

[*] Notice: The portion of the term of this patent subsequent to Aug. 12, 1997, has been disclaimed.

[21] Appl. No.: 118,316

[22] Filed: Feb. 4, 1980

Related U.S. Application Data

[63] Continuation of Ser. No. 907,856, May 19, 1978, Pat. No. 4,217,638.

[30] Foreign Application Priority Data

| May 19, 1977 | [JP] | Japan | 52-57100 |
| May 19, 1977 | [JP] | Japan | 52-57101 |
| May 19, 1977 | [JP] | Japan | 52-57102 |

[51] Int. Cl.³ .................... G06F 9/18; G06F 13/00
[52] U.S. Cl. ............................................. 364/200
[58] Field of Search ... 364/200 MS File, 900 MS File

[56] References Cited

U.S. PATENT DOCUMENTS

| 3,646,522 | 2/1972 | Furman | 364/200 |
| 3,793,631 | 2/1974 | Silverstein | 364/200 |
| 3,798,615 | 3/1974 | Weisbecker | 364/200 |
| 3,833,888 | 9/1974 | Stafford | 364/200 |
| 3,840,861 | 10/1974 | Amdahl | 364/200 |
| 3,858,182 | 12/1974 | Delagi | 364/200 |
| 3,938,098 | 2/1976 | Garlic | 364/200 |
| 3,940,745 | 2/1976 | Sajeva | 364/200 |
| 4,067,058 | 1/1978 | Brandstaetter | 364/200 |
| 4,079,453 | 3/1978 | Dahl | 364/200 |
| 4,079,455 | 3/1978 | Ozga | 364/200 |
| 4,086,627 | 4/1978 | Bennett | 364/200 |
| 4,087,854 | 5/1978 | Kwoshita | 364/200 |

OTHER PUBLICATIONS

"TMS 9900 Microprocessor Data Manual", Texas Instruments Inc., Oct. 1976, pp. 3-7.
"PDP 11/45 Processor Handbook", Digital Equipment Corp., 1971, pp. 9-13.
"Microprocessors and Microcomputers", B. Soucek, 1976, pp. 427-466.

Primary Examiner—James D. Thomas
Attorney, Agent, or Firm—Finnegan, Henderson, Farabow, Garrett & Dunner

[57] ABSTRACT

The data-processing apparatus of this invention comprises a central processing unit (hereinafter referred to as the "CPU"), and a plurality of a groups of memory units in the CPU to be applied as a general register set. The groups of memory units are provided in a number which is equal to the number of interrupt programs and each group has been previously supplied with information on the individual interrupt programs (such information includes, for example, data on entry address, program status word, etc.). The present data-processing apparatus further has a general register-set pointer provided in the CPU. Where the general register set pointer is supplied with a particular numerical value, the corresponding one of the memory unit groups is selectively used as a general register set.

4 Claims, 12 Drawing Figures

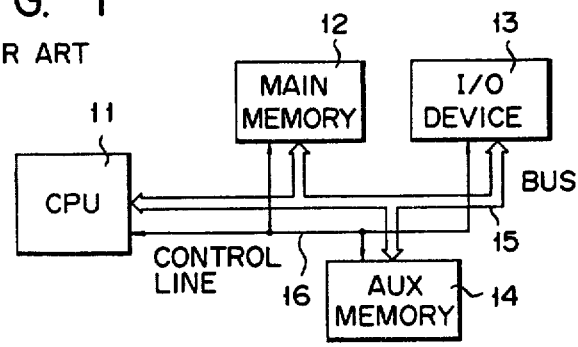
FIG. 1
PRIOR ART
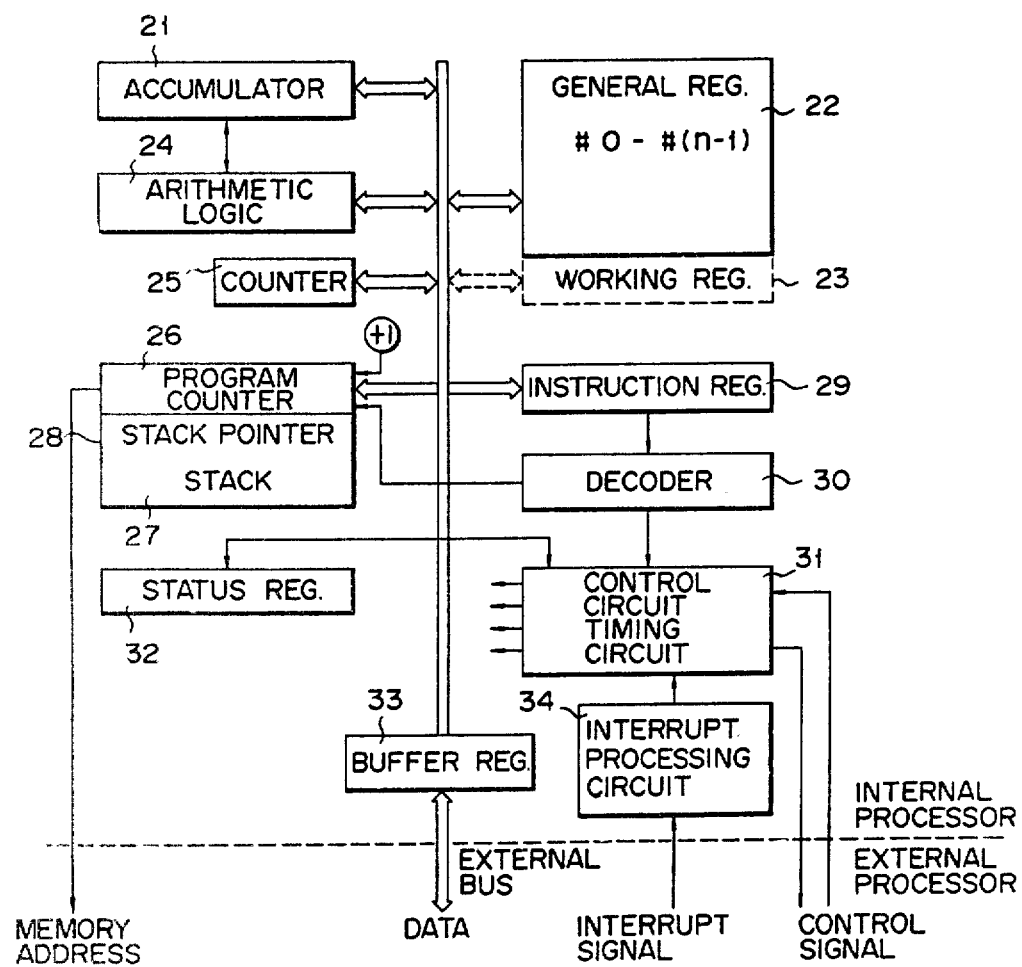
PRIOR ART  FIG. 2

| ADDRESS | CONTENTS |
|---|---|
| 0 | PROGRAM COUNTER (PC) |
| 1 | PSW |
| 2 | |
| 3 | |
| 4 | |
| 5 | |
| 6 | |
| 7 | |
| 8 | INTERRUPT REQUEST LINE #0 |
| 9 | INTERRUPT REQUEST LINE #1 |
| 10 | INTERRUPT REQUEST LINE #2 |
| 11 | INTERRUPT REQUEST LINE #3 |
| 12 | INTERRUPT REQUEST LINE #4 |
| 13 | INTERRUPT REQUEST LINE #5 |
| 14 | INTERRUPT REQUEST LINE #6 |
| 15 | INTERRUPT REQUEST LINE #7 |
| 16 | |
| 17 | |
| 18 | |
| 19 | |
| ⋮ | ⋮ |
| 4095 | STARTING ADDRESS |

F I G. 6
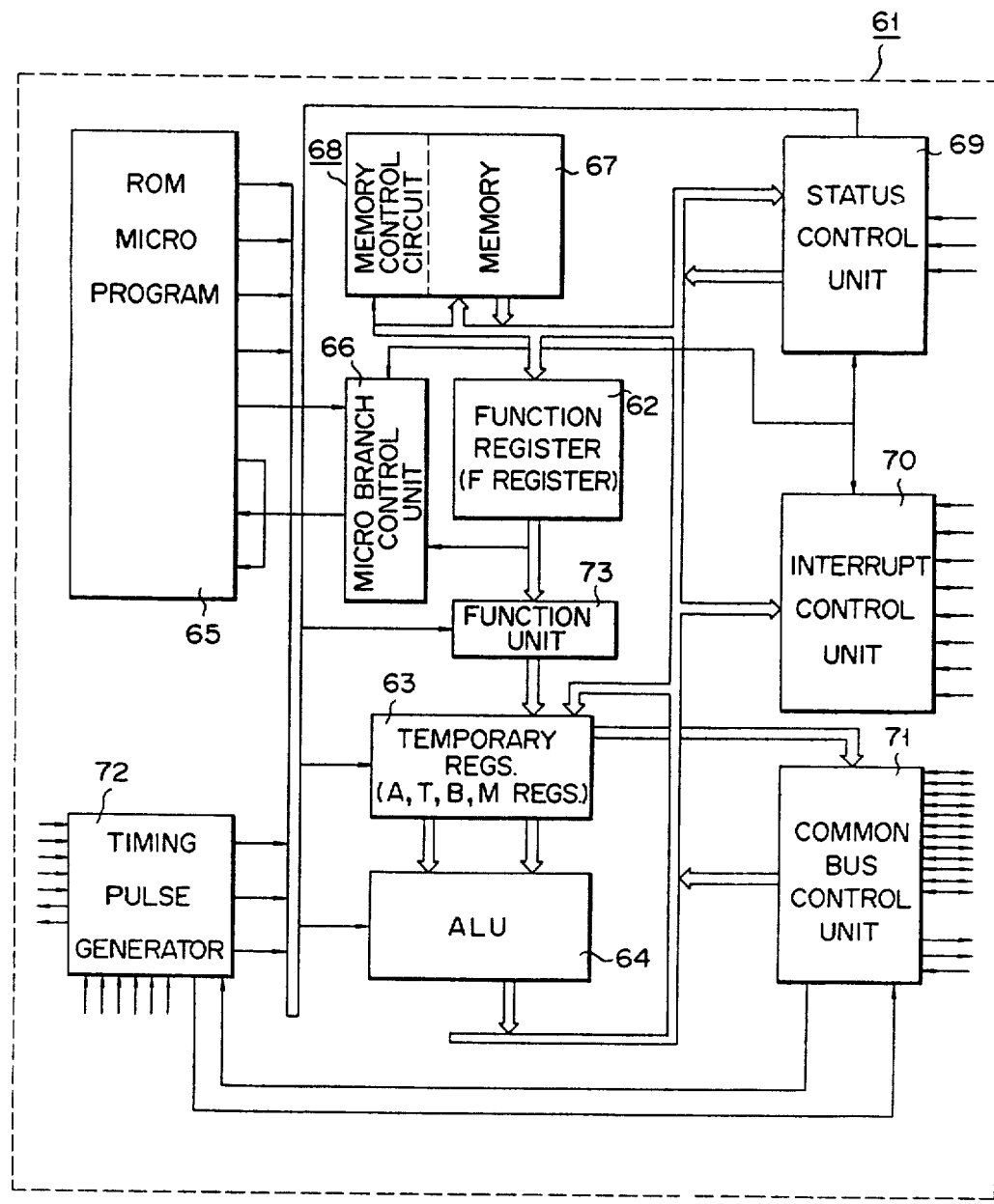

DATA-PROCESSING APPARATUS HAVING IMPROVED INTERRUPT HANDLING PROCESSOR

This is a continuation of application Ser. No. 907,856, filed May 19, 1978, now U.S. Pat. No. 4,217,638.

BACKGROUND OF THE INVENTION

In recent years, computers particularly microcomputers, have achieved noticeable and extensive development. At present, various applications are being devised to utilize the extensive advantages afforded by microcomputers which are as effective as, and yet more compact than, minicomputers.

For example, the microcomputer is applied not only to various control devices such as those for controlling a process and sequence, but also to instrumentation data-processing systems, minicomputer and business systems, and more recently to automobiles and general household appliances.

The fundamental elements of the microcomputer system are the CPU, memories and peripheral unit such as an input-output (I/O) device. These elements are connected by a bus and control signal line.

Referring to FIG. 1 showing the arrangement of a prior art microcomputer system, the CPU 11 is an arithmetic control unit including an arithmetic logic unit (hereinafter referred to as the "ALU"), control circuit and registers and acts as the control portion of the microcomputer system. The CPU 11 is generally formed of only one or two circuit chips fabricated by the large scale integration (LSI) technique. The CPU 11 controls the steps of decoding an instruction issued from a memory 12, carrying out an arithmetic operation on data read out of the address of the memory 12 specified by the instruction, supplying the result of the arithmetic operation to the memory 12, transferring program information and data from the I/O device 13 to the memory 12, and also transmitting data from the memory 12 to the I/O device 13. The CPU 11 further controls the designation of an address from which a program is to be read out and also the execution of the program according to the internal condition of the CPU 11. The memory 12 receives from the CPU 11 data on a given address and a control signal for specifying whether data is to be read out of said address or written therein, and causes the contents of the specified address to be read out to the CPU 11, or causes data supplied from the CPU 11 to be stored at the specified address.

The memory 12 generally includes a sequential memory and/or a random access memory (hereinafter referred to as a "RAM"). And the random access memory may further be categorized as a read-write memory normally admitting of reading and writing and a read only memory (hereinafter referred to as a "ROM"). Since the read-write memory is normally called a "RAM", a memory permitting both reading and writing is defined as a "RAM", and a memory only capable of effective reading is defined as a "ROM" in the specification.

The ROM is supplied with prescribed programs and data and the CPU executes prescribed program processes according to the contents of the ROM.

Data is transmitted from the I/O device 13 to a specified address of the memory 12 or vice versa according to the contents of an instruction issued from the CPU 11. The peripheral unit includes not only the aforesaid I/O device 13 but also an auxiliary memory 14. Data may be transmitted between the main memory 12 and auxiliary memory 14. The CPU 11, main memory 12, and I/O device 13 are interconnected by a bus 15. This bus 15 may be a bidirectional transmission line for transmitting words parallel-by-bit (two uni-directional bus lines may also be used instead of the bidirectional bus). A control line 16 includes, for example, a synchronization timing line, interrupt signal line and instruction line. The control line 16 is used for transmission of instructions issued from the CPU 11, timing signals, response signals delivered from the memories 12, 14 and peripheral unit, and interrupt signals.

There will now be described by reference to FIG. 2 the construction of the prior art CPU 11. The fundamental arrangement of the CPU 11 is broadly divided into the arithmetic logic system, control system and interface system. The arithmetic logic system comprises registers and the arithmetic logic unit (ALU). The register used for arithmetic operation mainly include an accumulator 21 and the general registers 22. The accumulator 21 is directly used in arithmetic operations and its function is well understood.

The general registers 22 can be applied to various different purposes such as arithmetic register, a data register and an index register, etc. In the present specification, the general registers 22 may be defined as a general register set including a program counter register, (hereinafter) referred to as the "PC") and a program status word register, (hereinafter referred to as the "PSW"), but the PC and PSW may not always be included in the general register set 22.

The customary practice is to provide 4 to 16 individually addressable registers in the general register 22 (which are marked by address) may be specified by the program.

In addition to the above-mentioned accumulator 21 and general registers 22, there is further provided another type of register referred to as "a working register 23" which is temporarily used to enhance the efficiency of arithmetic and control operations. The ALU 24 carries out the addition and subtraction of numerals expressed by binary codes and logic operations (AND, OR exclusive OR, etc.) in the form of parallel arranged bits. Multiplication and division are effected by a combination of addition, subtraction and shifting functions. A simple form of this shifting function is carried out by shifting one digit after another in the accumulator with the number of shifted digits counted by a counter. Another method of shifting is to provide an exclusive arithmetic logic unit referred to as "a shifter", thereby shifting a plurality of bits at once. A counter 25 is provided to count the number of shifted digits and the number of repeated cycles of multiplication and division.

A principal function of the central processing system is to control the designation of memory addresses, the decoding and execution of instructions and the status of, for example, the I/O device. The designating numerals of the addresses of the memories, 12, 14 are stored in address registers. Particularly the address from which an instruction included in a program is to be read out is stored in the PC register 26.

The PC, well known generally, is incrementally advanced by a count of +1 to specify the succeeding instruction address and holds the executing address of the current program instruction. The CPU may be further provided with a stack memory 27 for storing the contents of a return address where interruption or subroutine functions arise.

In the case of the CPU provided with the stack memory mentioned above, the stack 27 has push-down and pop-up functions and is such a type of memory as causes later stored data to be read out earlier (Last-In, First-Out, LIFO), and is formed of 4 to 16 layers. The function of the stack 27 is carried out by means of an address register or a stack-control memory referred to as "a stack pointer 28". Though possessed of the stack function, some processors are not actually provided with a stack memory, but utilize the main memory for said stack function with the above-mentioned type of processor, the stack pointer specifies an address only in the case of the stack function, causing data to be transmitted between the main memory and PC.

An instruction read out of the address specified by the program counter 26 is entered into an instruction register 29. The contents of the instruction register 29 are decoded by an instruction decoder 30 enabling initiation of various operations.

An output signal from the decoder 30 is delivered to a control circuit 31, an output from which is applied to the various sections of the data-processing apparatus in synchronization with a timing signal. The control method includes a wired-logic method and microprogram method. According to the wired-logic method, signals representing all the processing operations are formed through the control gates in the control circuit. Where an instruction is decoded, then the said control gates issue control signals to control the various sections of the data-processing apparatus.

According to a microgram control method typically employed, a set of instructions are used which are designed to execute the fundamental operations of the hardware. One instruction (user instruction or macro instruction) is converted into a combination of micro instructions, which are executed in succession with this microprogram control method. The control circuit has a simple arrangement and can be easily expanded or altered, but tends to be operated at a low speed. This drawback is for the reason that the complicated logic circuit has been converted into the form of a program represented by micro instructions. With the microprogram control method, the program is generally stored in the ROM. The program is executed through the same sequence of steps as in the aforesaid wired-logic method, that is, by designating an address of the ROM, retrieving a microinstruction and entering it into a micro instruction register, decoding the micro instruction read out of said register and thereafter issuing control signals. Status control involves the operation of supplying a specified element with information on the interior condition of a microcomputer or the status thereof specified by a microprogram, reading out the information, where necessary, and determining a control mode by reference to this information. With a microcomputer provided with a simple form of CPU, a status flip-flop circuit may be set or reset to preserve status information.

In a microcomputer equipped with a higher grade CPU, an exclusive status register 32 (FIG. 2) may be provided to store status information. The respective bits constituting the status register 32 are made to have previously defined functions, when status information is stored in the status register 32. The status register 32 is designed to cause the respective bits to be written therein or read out therefrom. The typical forms of status include the overflow of the arithmetic logic unit, the all zeros-all ones status of an accumulator (to prevent division by zero), mode designation, interrupt mask, fault indication and so forth.

The interface system of the CPU carries the buffing function, processing of an interruption instruction and synchronous control. The interface system acts as a sort of window through which data is transmitted between the processor and the external device. Data is transmitted through an input-output buffer register 33. Where there is a difference between the speed at which data is supplied from an external source and the speed at which the CPU receives the data, then the buffer register 33 acts to compensate for such difference.

An interrupt signal is a control signal applied from an I/O device to the processor independently of the operations occurring in the processor. Where the interrupt instruction-processing circuit 34 of the processor receives an interrupt instruction, then the internal operations of the processor are temporarily stopped to carry out the operation demanded by the interrupt instruction. Interruption has two forms, that is, an internal interruption resulting from a cause arising within the CPU and an external interruption arising from a cause mainly related to the I/O devices external to the processor. The causes of the internal interruption include, for example the overflow of digits resulting from calculation, errors in arithmetic operation such as a request for division by zero, memory errors (parity errors) and abnormal power supply conditions. The causes of external interruptions mainly include a request for termination of the operation of an I/O device and a service request made by a terminal unit. Namely, an external interruption takes place where a unit working independently of the control of the CPU desires to inform the CPU of the status of said unit or to be controlled by the CPU. The urgency of the interruption is classified according to the cause. Where interruption requests are generated, the CPU accepts those having higher degrees of urgency or higher priority levels. This is to prevent confusion where two or more interruption requests arise at the same time. In this case, an interruption request having a lower degree of urgency is made to wait or is disregarded. Where an interruption request is accepted, then the contents of not only the program counter but also various registers (for example, the status register and general registers) all included in the processor are temporarily stored in the memory (normally in the main memory). Thereafter, an interrupt program is executed in response to the interrupt request. In this case, the contents of the PC are replaced by the address which indicates the entry of the interrupt program.

Upon completion of the processing of the interrupt program, various data previously stored in the main memory are read out to the corresponding registers, and execution of the original program is resumed. This operation is generally carried out by a separately provided system program. Transmission of data between the memory and various registers is effected by more than ten steps. The total length of time required to execute all the program steps (including the "save" and "unsave" operations) amounts to several hundreds of milliseconds, thus decreasing the efficiency of the CPU.

Particularly where a plurality of interrupt requests arise in an extremely short time interval, for example, several microseconds, it is not too much to say that the quality of a processor can be determined from the speed at which an interruption request is executed.

A prior art program status word (hereinafter abbreviated as "PSW") used to control the execution of an interruption request has a bit arrangement as shown in FIG. 3. Individual mask bits are assigned to bit positions "0" to "7".

An interrupt program allotted to bit position "0" is taken to have the highest degree of urgency or the highest priority level. A bit occupying the bit position 8 is used as a master mask bit. Where this bit has a logic level of "1", then the execution of an interrupt program is entirely inhibited, namely, the CPU will not accept an interruption request. Various condition or flags are assigned to bits occupying bit positions 9 to 11. The bits 9 to 11 denote the "Carry" flag, "Negative" flag and "Zero" flag respectively and are used as condition codes.

The PSW having the above-mentioned bit arrangement is allocated to address 1 of the memory, as shown in the FIG. 4. The PC is assigned to address 0, and data registers and index registers are allocated to addresses 2 through 7. The addresses 8 to 15 receive data on the corresponding restart addresses of the interrupt programs, namely, linkage information. The address 4095 is used to store the designating numeral of the starting address of the main program.

When the CPU accepts a given interrupt request, then all the other interrupt requests are forced into a wait state. The contents of the PC are swapped for the contents of that of the addresses 8 to 15 which corresponds to the accepted interrupt program. The designating numeral of the restart address of the interruption service routine is stored in the PC.

With the above-mentioned prior art system, an interrupt program is processed in accordance with a flow chart shown, for example, in FIG. 8. First, examination is made of whether the master mask bit has a logic level of "0" or "1". Under the condition where interrupts are enabled, namely, when the master mask bit 8 is "0", the interrupt which is accepted is the one having the highest priority among those interrupts which have corresponding mask bits which are "1" (enabled). Suppose that the level N interrupt is accepted, the address (N+8), in which the linkage information for the level N interrupt is stored, is generated automatically by the hardware of the CPU. Then the linkage information and the contents of the PC are swapped. The linkage information itself is the entry address of the level N interrupt program. After the swap operation, a jump to the interrupt program takes place and at the same time the return address is saved in the address (N+8). At this time, the master mask bit 8 is made to have a logic level of "1", thereby inhibiting any other interrupt program from being accepted. Thereafter, the contents of the general registers are saved in the work area of the main memory. This operation is necessary to resume the execution of the original program after the interrupt program has been fully processed. However, the aforesaid operations, when performed by software, consume a great deal of time. Upon completion of the execution of the interrupt program routine, the contents of the general registers saved in the work area of the main memory are restored back to the original general registers by software. The operation of this software is also time-consuming.

As mentioned above, with the execution of an interrupt program by the prior art data-processing apparatus, it is necessary temporarily to save in another area the contents of the general registers, which are later required after the execution of the interrupt program has been completed, and to return said contents to the original area after said execution. Therefore, the above-described prior art data-processing apparatus is subject to certain limitations in processing data due to the relatively long time consumed in interrupt control and has a low responsiveness to interrupts.

When process control tasks are undertaken, it is necessary to handle interrupt requests issued by various sections of a microcomputer system and generate required outputs within a prescribed limited length of time. The above mentioned requests arise at random or at the same time. Requests occurring at random are supplied to the microcomputer as interrupt signals. Therefore, the microcomputer should have a quick responsiveness to these requests and execute them at high speed. To meet the above-mentioned requirements, a method has already been proposed which is designed to decrease a number of parts of a microcomputer requiring process control by applying software. For example, a device has been developed wherein a flip-flop circuit is provided in the CPU, and the operation of the flip-flop circuit is changed over according to the contents of an instruction received. A specific microprocessor proposed to date includes, for example, the "8080A MICROPROCESSOR" of Intel Corporation of the United States of America. This "8080A MICROPROCESSOR" issues an XCHG (exchange registers) instruction for the contents of an H register to be swapped for those of a D register and also for the contents of an L register to be swapped for those of an E register and an XTHL (exchange stack) instruction for the contents of an address of a memory specified by a stack pointer to be exchanged for those of said H and L registers. These instructions can indeed decrease the number of steps required in executing a program, but can not be expected appreciably to reduce the processing time, because the contents of the registers are saved in the memory or retrieved therefrom fundamentally by means of software. In view of the above-mentioned circumstances, another type of microprocessor has been proposed further to decrease the processing time. With this proposed microprocessor, a particular register is provided in the CPU. The work area of the memory disposed outside of the CPU is varied by changing the contents of the particular register. Such a microprocessor is described at pages 3 to 7 of "TMS 9900 MICROPROCESSOR DATA MANUAL" published by Texas Instrument Incorporated of the United States of America. With this microprocessor, a work space allocated to the external memory is varied by changing the contents of a work space register provided in the CPU. Even in this case, a memory unit acting as a work space register lies outside of the CPU. Therefore, this microprocessor only necessitates that a larger number of registers be provided. This microprocessor fails to decrease the processing time, because transmission of data between the CPU and the external memory consumes a great deal of time.

SUMMARY OF THE INVENTION

It is accordingly the object of this invention to provide a data processing apparatus and method for controlling a central processing unit in a manner to achieve extremely high speed processing.

Another object is to provide a data processing unit and method enabling utilization of simple software control.

A further object is to provide a data processing apparatus and method ensuring quick responsiveness to interrupt requests.

To attain the above-mentioned objects, this invention provides a data-processing apparatus and method wherein a central processing unit includes at least two groups of memory units, each said group being capable of acting as a general register set having a plurality of general registers.

BRIEF DESCRIPTION OF THE DRAWINGS

FIG. 1 is a schematic block circuit diagram of a prior art general data-processing apparatus;

FIG. 2 is a block circuit diagram of the prior art control processing unit shown in FIG. 1;

FIG. 6 is a schematic block circuit diagram of a central processing unit according to one embodiment of the present invention;

DETAILED DESCRIPTION OF THE PREFERRED EMBODIMENTS

Figures 3, 4:
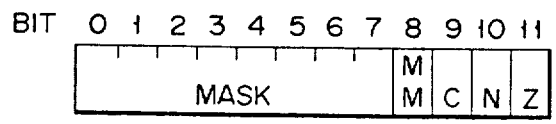
FIG. 3 is a diagram illustrating the function to which the respective bits of the prior art program status word are assigned.
FIG. 4 is a memory map for the prior art data processing apparatus.
Figure 5:
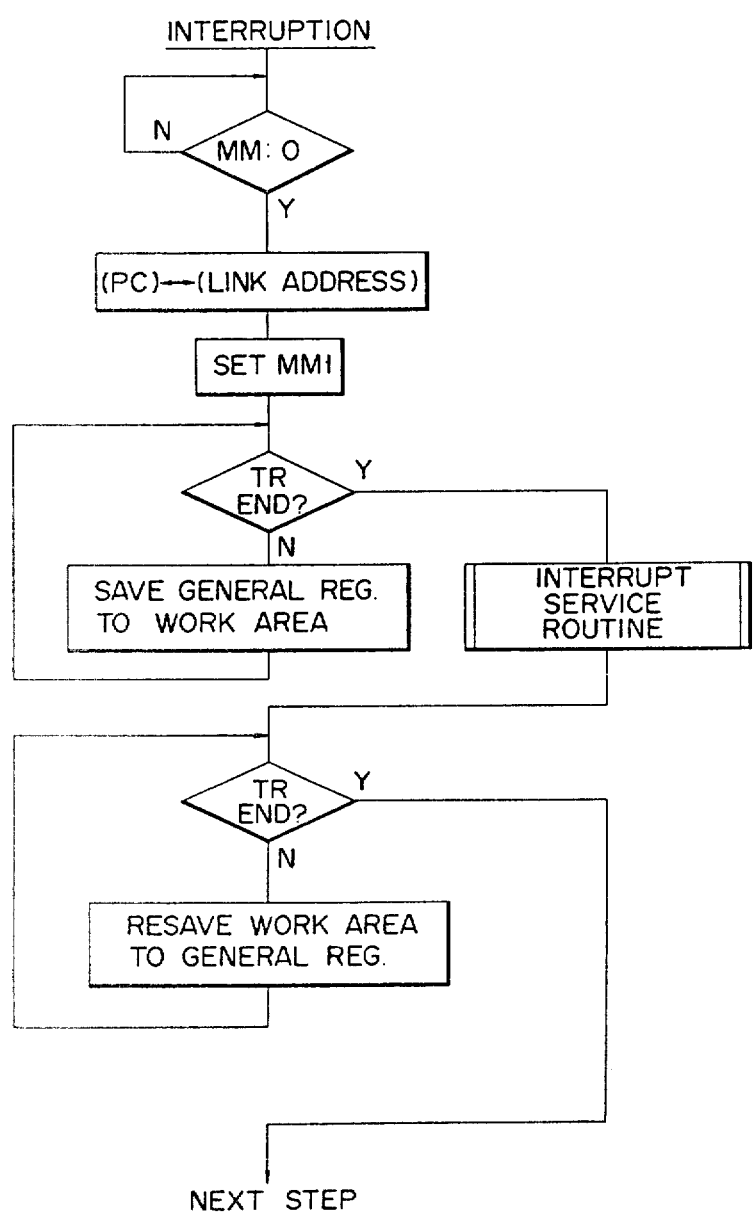
FIG. 5 is a flow chart showing the manner in which the contents of the respective general registers collectively constituting a set are saved and retrieved when an interrupt program is processed in the prior art data-processing apparatus.

FIG. 6 is a schematic block circuit diagram of a central processing unit (hereinafter referred to as a "CPU") according to one embodiment of the present invention. The CPU 61 comprises a single circuit chip having a function register (F register) 62 for decoding an execution instruction; temporary registers (A, T, B, M) 63 for temporarily storing data supplied from the function register 62; an arithmetic logic unit 64 for carrying out arithmetic logic operations such as addition, subtraction, AND, OR and shift with respect to data received from temporary registers 63; a microprogram ROM 65 for storing information on the sequence in which data is processed in the CPU 61; a microbranch control unit 66 for controlling the branching of a microprogram; memory means 67 provided with a plurality of (for example, eight) sets of memory units, each said set being capable of acting as a general register set including a program counter (not shown) for storing instruction status data; a memory control circuit 68 including, for example, a general register set pointer for specifying that memory unit group of the memory means 67 which is to be used as a general register set; a status control unit 69 including flip-flop registers for storing the current status of the CPU 61 and a circuit for controlling the status of said flip-flop registers; an interrupt control unit 70 including mask elements for interrupt requests and a circuit for selecting one of a plurality of simultaneously submitted interrupt requests which has the highest degree of urgency or priority; a common bus control unit 71 for controlling transmission of data between the CPU and the memory means or an input-outut device; a timing pulse generator 72 for producing clock pulses for defining the timing in which data is stored in the function register 62, temporary register 63 and general registers; and a special function unit 73 used, for example, to expand a bit arrangement.

With the CPU of the data-processing apparatus of this invention, data is transmitted between the respective block sections of said CPU in almost the same manner as in the prior art CPU, and the same types of control signals are used, description of said data transmission and control signals being omitted.

Figures 7, 8:
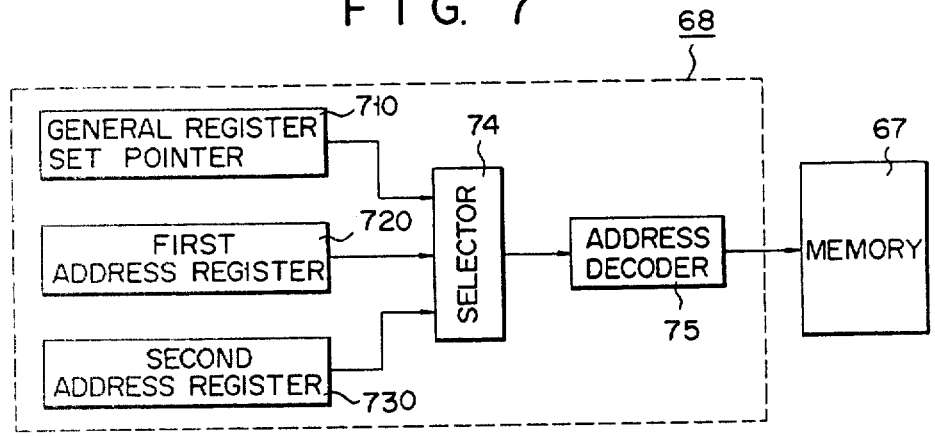
FIG. 7 is a block diagram illustrating the means for specifying the particular memory unit group which is to be used as a general register set in the system of FIG. 6.
FIG. 8 is a memory map for the FIG. 6 embodiment of the data-processing apparatus of the invention.

There will now be described by reference to FIG. 7 the improvement in the operation of the memory means and memory control circuit, which are achieved by the present invention.

The memory means 67 comprises a plurality of (for example, eight) memory unit groups $M_0$ to $M_7$ which are collectively formed of a large number of absolute addresses 0 to 63. These memory unit groups $M_0$ to $M_7$ are each capable of acting as a general register set, having a plurality of (for example, eight) general registers $R_0$ to $R_7$. The memory unit groups ($M_0$ to $M_7$) are divided from the memory means 67 and each group corresponds to the divided block of the memory means 63.

The memory control circuit 68 comprises a general register set pointer register 710 including, for example, three bits, as means for specifying a particular general register set. This general register set pointer register specifies that of the plural memory unit groups which is to be used as a general register set. Where the 3-bit pointer of a general register set is represented by a binary code of "000", then the memory unit group $M_0$ is selected as a general register set. Where said 3-bit pointer is expressed by the binary code "111", then the memory unit group $M_7$ is designated as a general register set.

The memory control circuit 68 also includes a first address register 720 which is designed to select the particular one of the general registers $R_0$ to $R_7$ belonging to the general register set which has been designated by the general register set pointer register 710. Where the contents of the first address register 720 are denoted by a binary code of "000", then the register $R_0$ is selected. Where the contents of said first address register is represented by a binary code of "111", then the register $R_7$ is picked up.

The second address register 730 is used to access the contents of the memory area within $M_0$ to $M_7$ which is not specified as the general register set area. Therefore, this register provides the means by which the memory area from $M_0$ to $M_7$ can be accessed as an ordinary RAM working area. For example if the general register set pointer is "001" in binary, the registers which are accessed as the general registers are those located in the memory area $M_1$ (address 8 to 15), and at the same time $M_0$ through $M_7$ (including $M_1$) can be accessed as an ordinary RAM working area by way of the second address register. Needless to say, in this case $M_1$ should always be accessed as the general registers for efficiency of execution. The second address register 730 has a 6-bit arrangement. Since each of the eight memory unit groups $M_0$ to $M_7$ has eight registers $R_0$ to $R_7$, any of sixty-four absolute addresses 0 to 63 corresponding to sixty-four general registers is specified each time.

The output terminals of the general register set pointer register 710, first address register 720 and second address register 730 are connected to the corresponding input terminals of a selector 74. This selector 74 receives as the upper 3 bits of a 6-bit address signal the output from the general register set pointer register 710, and receives as the lower 3 bits of address signal the output of the first address register 720. In addition, selector 74 receives the 6 bit address delivered from the second address register 730. The output signal from selector 74 is decoded by an address decoder 75 to select a particular memory unit group or general register included in the memory means.

There will now be described the memory means 67. This memory means comprises, as shown in FIG. 8, a large number of absolute addresses 0 to 4095. These absolute addresses are allocated to, for example, eight memory unit groups. Absolute addresses 0 to 7 are allocated to a memory unit group $M_0$; absolute addresses 8 to 15 to a memory unit group $M_1$; absolute addresses 16 to 23 to a memory unit group $M_2$; absolute addresses 24 to 31 to a memory unit group $M_3$; absolute addresses 32 to 39 to a memory unit group $M_4$; absolute addresses 40 to 47 to a memory unit group $M_5$; absolute addresses 48 to 55 to a memory unit group $M_6$; and absolute addresses 56 to 63 to a memory unit group $M_7$. These memory unit groups correspond to the general register sets. According to the above-mentioned embodiment, eight general register sets $GRS_0$ to $GRS_7$ are provided. These eight general register sets $GRS_0$ to $GRS_7$ are each formed of eight general registers $R_0$ to $R_7$. General register $R_0$ is assigned to the program counter PC, and general register $R_1$ to a program status word PSW. The general register $R_2$ to $R_7$ are all used as working registers or index registers, etc.

Now let it be assumed that eight interrupt programs whose priority levels range from $P_0$ to $P_7$ are going to be executed, and that these programs $P_0$ to $P_7$ correspond to the memory unit groups $M_0$ to $M_7$ in the order mentioned. Further, let it be supposed that an interrupt program having a priority level "2" is being processed, with the memory unit group $M_2$ being used as the general register set. In this case, the contents of the PSW are represented by the bit arrangement shown in FIG. 3. Referring to the mask bits 0 to 7, the bit 0 (corresponding to level 0 interrupt) and the bit 1 (corresponding to level 1 interrupt) are both set at a logic level "1". The bits 2 to 7 are set at a logic level "0". The master mask bit 8 is set at a logic level "0" to permit the acceptance of an interrupt request. The condition flags, that is, the carry flag C (represented by the bit 9), negative flag N (denoted by the bit 10) and zero flag Z (indicated by the bit 11) are all set at a logic level "0". Now let it be assumed that under the above-mentioned conditions, an interrupt program having a priority level "1" calls for execution, while the aforesaid interrupt program having a priority level "2" is still being processed. Since the master mask bit of the PSW has a logic level "0", the interrupt program having priority level "1" is masked by the individual mask bit (bit "1" of the PSW). Since the bits 0 and 1 of the PSW have a logic level "1", the interrupt program having the priority level "1" is accepted. Further let it be assumed that the contents of the accepted interrupt program having a priority level "1" were previously stored in the memory unit group $M_1$. Assuming in this case that the interrupt program having a priority level "1" is processed with the memory unit group $M_1$ used as a general register set, then the general register set pointer 7 is supplied with a value expressed by the binary code "001" in accordance with the microprogram stored in, for example, the ROM 65. At this time, the original data of the general register set pointer 71 is saved in a temporary buffer, for example, pushed in the stack or saved at the address of the RAM corresponded to the interrupt level. This process whereby the original data is saved in a temporary buffer and a new data is set in the general register set pointer may be executed at once by the "SWAP" instruction. The memory unit group $M_1$ in which the contents of the interrupt program having the priority level "1" is now stored is used as the general register set. The contents of the general register set used with the interrupt program having a priority level "2" are retained in the memory unit group $M_2$. Since the memory unit group $M_1$ is used as a general register set with respect to the interrupt program having a priority level "1", the corresponding program counter $PC_1$ is now used. The contents of this program counter $PC_1$ denotes an entry address namely, an execution start address, thereby executing the interrupt program having a priority level "1". Upon completion of the execution of the interrupt program having a priority level "1", the general register set pointer is supplied with a value expressed by the binary code "010" in accordance with a user program coded at the end of the interrupt program in order to execute the preceding interrupt program having a priority level "2". The shifting of the contents of the general register set pointer 71 to a binary code "010" is effected by popping up the contents of the stack to the general register set pointer or swapping the saved data in the save area in the case of a system not provided with a stack memory.

The data processing apparatus of this invention arranged as described above can execute any interrupt program simply by changing the value stored in the general register set pointer, making it unnecessary to save the contents of the respective registers in the same area of the memory or retrieve said contents therefrom. Therefore, the present data-processing apparatus reduces processing time and displays rapid resposiveness to interrupt requests.

With the foregoing embodiment, the CPU comprises a single circuit chip, but the CPU may be composed of, for example, two circuit chips. Further, while the CPU comprises a 12 bit format in the foregoing embodiment, it may comprise for example, a 4 bit, 8 bit or 16 chip format.

Figures 9, 10, 11:
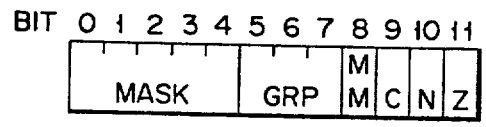
FIG. 9 is a diagram depicting the function of the respective bits of the program status word used with the data-processing apparatus of the invention.
FIG. 10 is a memory map for another embodiment of the data-processing apparatus of the invention.
FIG. 11 is a memory map showing a common register provided between the respective sets of general registers.

There will now be described with reference to FIG. 9 another embodiment of the invention. The program status word PSW comprises five mask bits 0 to 4. The bit 0 corresponds to a priority level "0"; the bit 1 to a priority level "1", the bit-2 to a priority level "2", the bit-3 to a priority level "3"; and the bit-4 to a priority level "4". The bits 5 to 7 are assigned to the general register set pointer. The bit-8 is used as a master mask bit. The bits 9 to 11 are used as condition code representing a carry flag, negative flag, and zero flag respectively, as previously described. FIG. 10 shows a memory map for the embodiment of FIG. 9. Absolute addresses 0 to 7 are allocated to a memory unit group $M_0$; absolute addresses 8 to 15 to a memory unit group $M_1$; absolute addresses 16 to 23 to a memory group $M_2$; absolute addresses 24 to 31 to a memory unit group $M_3$; absolute addresses 32 to 39 to a memory unit group $M_4$; absolute addresses 40 to 47 to a memory unit group $M_5$; absolute addresses 48 to 55 to a memory unit group $M_6$; and absolute addresses 56 to 63 to a memory unit group $M_7$. These memory unit groups $M_0$ to $M_7$ respectively constitute general register sets $GRS_0$ to $GRS_7$. A program counter PC is provided at the general register address 0 of each of the respective general register sets $GRS_0$ to $GRS_7$. The PSW is stored in the general register address 1 of each of the respective general register sets $GRS_0$ to $GRS_7$. The PSW has the same bit arrangement as shown in FIG. 9 for all the memory unit groups $M_0$ to $M_7$. Although, in the case of hardware, eight PSW registers would be essentially required, a single PSW register can well serve the purpose, because the PSW's of the general register sets $GRS_0$ to $GRS_7$ have the same bit arrangement as described above. Further, absolute addresses 64 to 71 are provided as save areas in which the contents of the PSW registers 0-7 are temporarily stored.

Now let it be assumed that the embodiment of FIG. 9 arranged as described above is executing an interrupt program having a priority level "1", and the contents of the interrupt program is stored in the general register set $GRS_1$. Further, let it be supposed that the contents of the PSW include the mask bits, of which the bit 0 has a logic level "1" and the bits 1 to 4 have a logic level "0". Further, as $GRS_1$ is used for the general register set mentioned above, the general register set pointer designates the memory unit group $M_1$, the master mask bit 8 is denoted by a logic level "0"; the bits 9 to 11 used as condition codes are all set at a logic level "1"; and an interrupt program having a priority level "0" demands execution under the above-mentioned condition. Then said interrupt program is accepted. Next, the contents of the $PSW_0$ (absolute address 64) which is the save area for the PSW of the memory group corresponding to the interrupt program having the priority level 0 and the contents of the PSW register are swapped. Now the contents of the $PSW_0$ are supplied to the PSW register as the new value for the PSW, ad the PC in the new general register set designated by the bits 5 to 7 of the new PSW is used as a program counter, thereby ensuring the execution of the above-mentioned interrupt program having a priority level "0". The embodiment of FIG. 9 is as effective as that of FIG. 8 in simplifying the hardware arrangement and consequently rendering the CPU especially compact. Further, software for setting the values to the general register set pointer and the PSW can be controlled more easily.

There will now be described with reference to FIG. 11 still another embodiment of this invention. In the memory map of FIG. 11, having addresses 0 to 4095, absolute addresses 0 to 7 are allocated to a memory unit group $M_0$; absolute addresses 8 to 15 to a memory unit group $M_1$; absolute addresses 16 to 23 to a memory unit group $M_2$; absolute addresses 24 to 31 to a memory unit group $M_3$; absolute addresses 32 to 39 to a memory unit group $M_4$; absolute addresses 40 to 47 to a memory unit group $M_5$; absolute addresses 48 to 55 to a memory unit group $M_6$; and absolute addresses 56 to 63 to a memory unit group $M_7$. Further, the address 4095 is supplied with the contents of a starting address used to commence the execution of an interrupt program. The above-listed memory unit groups $M_0$ to $M_7$ respectively correspond to the general register sets $GRS_0$ to $GRS_7$. Each of these general register sets is formed of eight general registers $GR_0$ to $GR_7$. The general register addresses 0 and 1, namely, registers $R_0$ and $R_1$ are allocated to the PC and PSW respectively.

The general register $R_7$ of the general register set $GRS_0$ and the general register $R_7$ of the general register set $GRS_1$ are specified as common registers. There will be described below the method of using these common registers. Referring to the application of, for example, addresses 7, 15 as common registers, the contents of the address 7 are expressed by the binary code "000111" (of which the extreme right bit represents the least significant bit and the extreme left bit represents the most significant bit). The contents of the address 15 are represented by the binary code "001111". It is seen from these bit patterns that when the third bits of said two bit patterns are removed, then the contents of the addresses 7, 15 have the same bit pattern. Where, therefore, the five other bits than the third one are decoded, then the same memory unit group is selected, regardless of whether the address 7 or 15 is accessed.

There will now be described a specific method capable of freely converting a given register into a common type by means of software. In this case, since the PC is supplied with the same linkage information necessary for execution of an interrupt request, and the same form of PSW is selected as in the embodiment of FIG. 8, description of the PC contents and the PSW form will be omitted.

Figure 12:
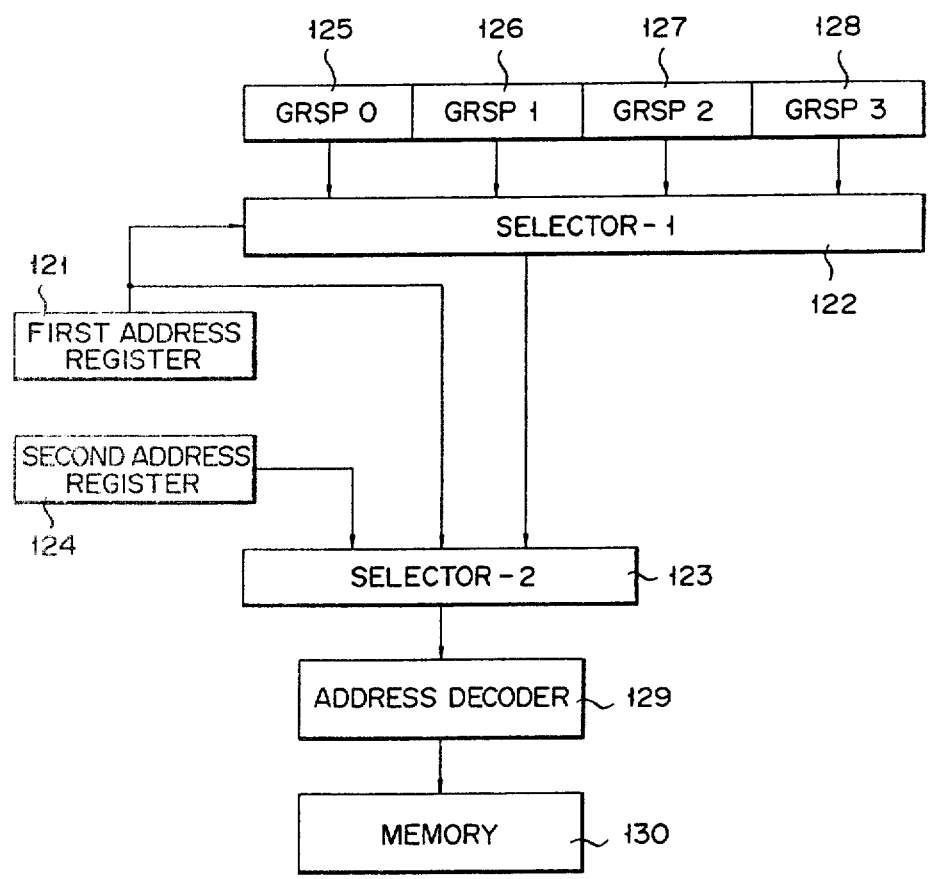
FIG. 12 is a block diagram showing the means for specifying a particular common register for use in the system of the invention.

Referring to FIG. 12 illustrating a common register forming circuit, the output terminal of a first address register 121 is connected to the input terminal of a first selector 122 and further to the input terminal of a second selector 123. The first address register 121 is supplied with the designating numeral of the selected one of the general register $R_0$ to $R_7$ of the respective general register sets.

The output terminal of the second address register 124 is connected to the input terminal of the second selector 123. This second address register 124 has a 6-bit arrangement and is supplied with the designating numeral of the selected one of the individual registers of a memory unit group which does not constitute a general register set. The output terminals of general register set pointers GRSP-0 to GRSP-3 (125, 126, 127, 128) are connected to the corresponding input terminals of the first selector 122.

The general register set pointer GRSP-0 (125) specifies a memory unit group corresponding to an interrupt program as a general register set. The general register set pointers GRSP-1 to GRSP-3 (126, 127, 128) select any of the memory unit groups $M_0$ to $M_7$. The output terminal of the first selector 122 is connected to the corresponding input terminal of the second selector 123. The output terminal of this second selector 123 is connected to the input terminal of an address decoder 129, whose output terminal is connected to a memory means 130. There will now be described the operation of a common register forming circuit arranged as described above.

Selection of any of the four general register set pointers GRSP-0 to GRSP-3 (125 to 128) is determined by the contents of the first address register 121. Where the first address register 121 is supplied with a value of "0", then the general register $R_0$, namely, the program counter is selected. Accordingly, the general register set pointer GRSP-0 (125) is used to select the corresponding general register set. Where the first address register 121 is supplied with a value of "1", then the general register $R_1$, namely, the PSW is picked up. The general register set pointer GRSP-0 (125) is also used to specify the corresponding general register set. Where the first address register 121 is supplied with a value of "2", then the general register $R_2$ is selected. At this time, the general register set pointer GRSP-1 (126) is used to specify the corresponding general register set. When the first address register 121 is set at a value of "3", then the general register $R_3$ is selected. The general register set pointer GRSP-1 (126) is also used to designate the corresponding general register set. Where the first address register 121 is supplied with a value of "4" or "5", then the general register $R_4$ or $R_5$ is selected accordingly. In this case, the general register set pointer GRSP-2 (127) is applied for specification of the corresponding general register set. Where the contents of the first address register 121 are expressed by a value of "6" or "7", then the general register $R_6$ or $R_7$ is selected accordingly. The general register set pointer GRSP-3 (128) is used for designation of the corresponding general register set.

Now let it be assumed that a memory unit group $M_0$ is going to be used as the general register set, that is, GRSP-0 (125) is set to "0", and the general register set pointer GRSP-1 (126) is supplied with a value of "4". If, in this case, the general register $R_2$ is used, then the first address register 121 is at a value of "2". Accordingly, the general register set pointer GRSP-1 (126) is used for specification of the corresponding general register set. Since the general register set pointer GRSP-1 (126) is supplied with a value of "4", the general register $R_2$ of memory unit group $M_4$, namely, absolute address 34, is specified.

The three lower order bits of the 6-bit data word supplied to the second selector 123 represent the contents of the first address register 121 or a binary code of "010". The three higher order bits of said input data denote the contents of the general register set pointer GRSP-1 (126), or a binary code of "100". As the result, a total input data supplied to the second selector 123 is expressed by binary code of "100010" causing an absolute address 34 to be specified.

The above-mentioned arrangement of the memory means has the advantage that where it is desired to refer to the contents of the register $R_7$ of a memory unit group $M_1$, while, for example, memory group $M_0$ is used as the general register set, then it is unnecessary to specify an absolute address 15 in this case; and the contents of the absolute address 15 can be consulted simply by specifying the common register $R_7$ by pre-setting "001" in the general register set pointer GRSP-3, thereby shortening the processing time due to the omission of the program step of specifying said absolute address 15. That is, data blocks of maximum 6 words can be transferred at once by rewriting the bits in any of the GRSP-1 to GRSP-3 registers.

Further advantages of the aforesaid memory means are that when a given interrupt program is executed by reference to data obtained by calculation or execution of another interrupt program, then designation of an absolute address can be omitted, thereby decreasing the number of steps required for executing the interrupt program with a resultant reduction of processing time; and since the general registers $R_0$ and $R_1$ included in the group of general registers $R_0$ to $R_7$ constituting the respective general register sets are assigned to the PC and PSW, the step of transmitting the contents of the remaining general registers $R_2$ to $R_7$ can be omitted (actually, it is possible to omit twelve or thirteen steps of transmitting the contents of said general registers), thus eventually shortening processing time by 200 to 300 microseconds.

With the foregoing embodiments, the respective general register sets comprised the same number of general registers. However, the general register sets may each include an optional number of general registers. Though eight general register sets were provided; the number of said sets need not be limited to eight, but may be varied with the number of interrupt programs which have to be executed.

The PSW having the bit arrangement of FIG. 9 can be applied with the same effect as the PSW having the bit arrangement of FIG. 3.

What we claim is:

1. A data processing apparatus comprising a central processing unit formed in a single IC chip for comparing data, arithmetically processing data and branching data, said central processing unit including a memory including a plurality of addressable memory locations, and at least two general register sets, each of said general register sets comprising a plurality of associated general registers for storing a program counter, a program status word, and data, and a general register set pointer for designating any of said general register sets, each of said general registers of each of said general register sets having a first address to be designated when said general register set pointer designates said associated general register set and a second address to designate a memory location used as a work area when said general register set pointer designates the other of said general register sets, said general register sets including at least one common general register for storing data associated with either of said general register sets, and means for addressing said common general register to store data therein.

2. In a data processing system having a central processing unit including an internal memory containing a plurality of addressable register locations and means for addressing said register locations in response to address data contained in specified addressing registers, the combination comprising:

a pointer address register containing a first general register set pointer code designating a first group of register locations in said internal memory, at least one of said locations in said first group containing a common general register applicable to a first program;

a first address register containing a register address code designating a selected register location within the group of register locations designated by said pointer code;

means for combining the address codes from said pointer address register and said first address register to combine said first pointer and address codes to form a first address for accessing said selected register location within said first group of register locations in said internal memory through said means for addressing during execution of said first program;

means for detecting a request to initiate execution of a second program;

means for entering a second general register set pointer code into said pointer address register in response to said request, said second code designating a second group of register locations in said internal memory, at least one of said locations in said second group containing a common general register applicable to said second program; and means for enabling said means for combining the address codes from said pointer address register and said first address register to combine said second pointer and address codes to form a second address for accessing said selected register location within said second group of locations in said internal memory through said addressing means during execution of said second program.

3. In a data processing system having a central processing unit including an internal memory containing a plurality of addressable register locations and means for addressing said register locations in response to address data contained in specified addressing registers, the combination comprising:

a pointer address register containing a first general register set pointer code designating a first group of register locations in said internal memory, at least one of said locations in said first group containing a program counter applicable to a first program;

a first address register containing a register address code designating a selected register location within the group of register locations designated by said pointer code;

means for combining the address codes from said pointer address register and said first address register to combine said first pointer and address codes to form a first address for accessing said selected register location within said first group of register locations in said internal memory through said means for addressing during execution of said first program;

means for detecting a request to initiate execution of a second program;

means for entering a second general register set pointer code into said pointer address register in response to said request, said second code designating a second group of register locations in said internal memory, at least one of said locations in said second group containing a program counter applicable to said second program; and means for enabling said means for combining the address codes from said pointer address register and said first address register to combine said second pointer and address codes to form a second address for accessing said selected register location within said second group of locations in said internal memory through said addressing means during execution of said second program.

4. In a data processing system having a central processing unit including an internal memory containing a plurality of addressable register locations and means for addressing said register locations in response to address data contained in specified addressing registers, the combination comprising:

a pointer address register containing a first general register set pointer code designating a first group of register locations in said internal memory, at least one of said locations in said first group containing a program status word applicable to a first program;

a first address register containing a register address code designating a selected register location within the group of register locations designated by said pointer code;

means for combining the address codes from said pointer address register and said first address register to combine said first pointer and address codes to form a first address for accessing said selected register location within said first group of register locations in said internal memory through said means for addressing during execution of said first program;

means for detecting a request to initiate execution of a second program;

means for entering a second general register set pointer code into said pointer address register in response to said request, said second code designating a second group of register locations in said internal memory, at least one of said locations in said second group containing a program status word applicable to said second program; and means for enabling said means for combining the address codes from said pointer address register and said first address register to combine said second pointer and address codes to form a second address for accessing said selected register location within said second group of locations in said internal memory through said addressing means during execution of said second program.

* * * * *